(No Model.)
J. THORNTON.
SPARK ARRESTER.
No. 485,901. Patented Nov. 8, 1892.
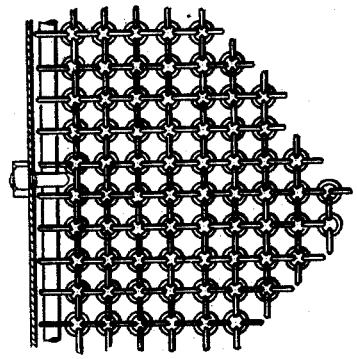
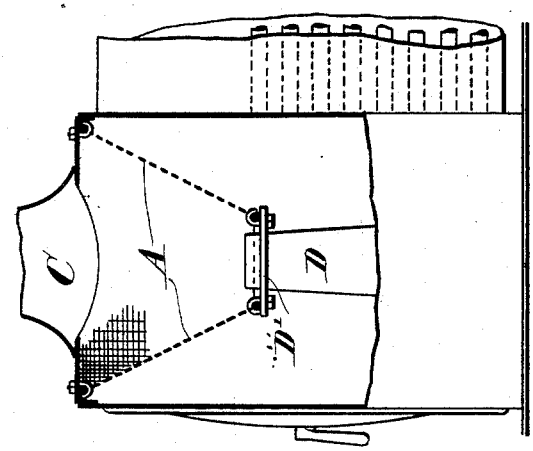
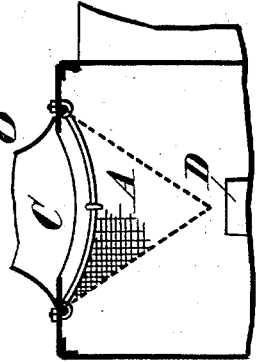
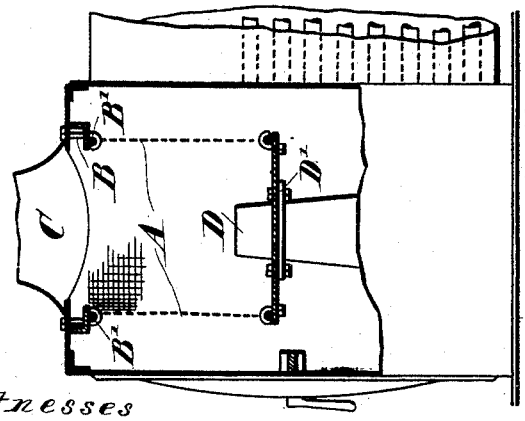
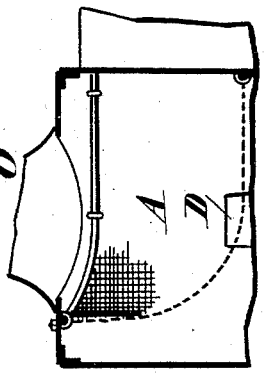
Witnesses
W. H. Courtland
William H. Palmer
Inventor
JOHN THORNTON
BY HIS ATTORNEY
Edward P. Thompson

UNITED STATES PATENT OFFICE.

JOHN THORNTON, OF MELBOURNE, VICTORIA.

SPARK-ARRESTER.

SPECIFICATION forming part of Letters Patent No. 485,901, dated November 8, 1892.

Application filed October 13, 1891. Serial No. 408,582. (No model.)

*To all whom it may concern:*

Be it known that I, JOHN THORNTON, contractor, a subject of Her Majesty the Queen of the United Kingdom of Great Britain and Ireland, and a resident of Oxford Chambers, Bourke Street, Melbourne, in the British Colony of Victoria, have invented a new and useful Improvement in Spark-Arresters, of which the following is a specification.

My invention relates to the construction of means for arresting sparks in a locomotive; and its object is to obtain improved construction as to mechanical details.

To arrest sparks and prevent them leaving the smoke-box of a locomotive or a portable engine boiler, I arrange a cylindrical or a conical cage, made, preferably, of ring or link wire-netting, to inclose or surround the space between the bottom of funnel and top of exhaust-pipe, the meshes between the links or rings of the netting being as fine as it is possible to have them without retarding the draft. Consequently no sparks or cinders of a size large enough to do damage can pass out of the funnel, any small ones that may pass through the netting being extinguished by the exhaust-steam. The top edge or ring of the cage I support from a flange or bolt or secure it under the crown-plate of smoke-box, while the bottom ring or edge of cage I secure to a flange upon exhaust or blast pipe. The side of netting I leave somewhat slack, so that at each puff or exhaust of the steam the netting of cage is vibrated; or, in other words, the netting is kept in a state of tremor while the engine is working, and thus no sparks or cinders can remain in the meshes or links of the netting. When so desired, I may use two layers of netting for the cage.

In order that my invention may be fully understood, I attach a sheet of drawings, which illustrate the several forms that the cage may take when employed in the smoke-box of a locomotive or a portable engine boiler.

In Figure 1 the cage A is of cylindrical form, its top edge or ring being secured to the flange B under crown-plate of smoke-box and around bottom of funnel C by hook-bolts B'. The bottom edge or ring of cage passes some distance below top of exhaust-pipe D and is then secured or bolted to a flange D'. When the cage is of a much larger diameter than the exhaust-pipe, its bottom flange end may be perforated.

In Fig. 2 the cage A is shown of a conical form with its lower ring or end secured to flange D' around blast-pipe D.

In Fig. 3 the cage A is again shown inclosing the space between the top of exhaust-pipe D and bottom of funnel C; but the cage is neither cylindrical nor conical, as its sides stretch to and terminate upon face of tube-plate.

In Fig. 4 the cage A is conical and suspended around bottom end of funnel C and above exhaust-pipe D, while in Fig. 5 I show full-size pattern of the ring netting that I prefer for the cages.

Having now particularly described and ascertained the nature of my said invention and in what manner the same is to be performed, I declare that what I claim is—

1. A spark-arrester consisting of a cylindrical or a conical shaped cage formed of rings linked together, forming a netting, which is left slack and so located as to surround the space between the opening leading to the funnel and top of exhaust-pipe.

2. In combination with the funnel of a locomotive, a vibratory netting formed of rings linked loosely together and forming a partition between the funnel and the smoke-box.

In testimony that I claim the foregoing as my invention I have signed my name, in presence of two witnesses, this 31st day of August, 1891.

JOHN THORNTON.

Witnesses:
BEDDINGTON BODEYARDS,
FRED CHAMBERLAIN.